United States Patent
Zouboff

(10) Patent No.: US 11,560,860 B2
(45) Date of Patent: Jan. 24, 2023

(54) PROCESSING METHOD FOR CAMSHAFT SENSOR

(71) Applicant: VITESCO TECHNOLOGIES GmbH, Hanover (DE)

(72) Inventor: Pierre Zouboff, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/259,805

(22) PCT Filed: Jul. 11, 2019

(86) PCT No.: PCT/EP2019/068732
§ 371 (c)(1),
(2) Date: Jan. 12, 2021

(87) PCT Pub. No.: WO2020/011941
PCT Pub. Date: Jan. 16, 2020

(65) Prior Publication Data
US 2021/0222636 A1 Jul. 22, 2021

(30) Foreign Application Priority Data
Jul. 13, 2018 (FR) ...................................... 1856500

(51) Int. Cl.
*F02D 41/00* (2006.01)
*G01D 5/244* (2006.01)
*G01M 15/06* (2006.01)

(52) U.S. Cl.
CPC ....... *F02D 41/009* (2013.01); *F02D 41/0097* (2013.01); *G01D 5/24466* (2013.01); *G01M 15/06* (2013.01)

(58) Field of Classification Search
CPC ...... F02D 41/009–0097; F01L 2800/14; F01L 2820/041; G01D 5/24466; G01M 15/06
See application file for complete search history.

(56) References Cited

U.S. PATENT DOCUMENTS 4,783,627 A * 11/1988 Pagel .................... F02P 7/0675
324/207.25
4,959,996 A * 10/1990 Akasu ................... F02D 41/009
123/406.6
(Continued)

FOREIGN PATENT DOCUMENTS

CN 1683757 A 10/2005
CN 106948957 A 7/2017
(Continued)

OTHER PUBLICATIONS

International Search Report and Written Opinion of the ISA for PCT/EP2019/068732, dated Sep. 17, 2019, 9 pages.
(Continued)

*Primary Examiner* — Hung Q Nguyen
*Assistant Examiner* — Brian R Kirby
(74) *Attorney, Agent, or Firm* — Nixon & Vanderhye

(57) ABSTRACT

The invention relates to a device and a processing method for a camshaft sensor (1) of the type comprising a toothed camshaft wheel (2) and an opposite sensing element (3) able to detect a tooth front, comprising the following steps: detection of a new tooth front (k) by said sensing element; calculation of a rotational speed (Wk) of the camshaft wheel (2) for the new tooth front (k); comparison with the rotational speed (Wk-1) of the camshaft wheel for the preceding tooth front (k-1) detected by said sensing element; if the variation in the rotational speed (Wk) of the camshaft wheel (2) between the new tooth front (k) and the preceding tooth front (k-1) is low, the new tooth front (k) is validated, otherwise the new tooth front (k) is rejected.

20 Claims, 1 Drawing Sheet

(56) References Cited

U.S. PATENT DOCUMENTS

| | | | | |
|---|---|---|---|---|
| 5,056,360 | A | * | 10/1991 | Dosdall ................. G01P 15/165 |
| | | | | 73/114.24 |
| 5,117,681 | A | * | 6/1992 | Dosdall ............... F02D 41/2441 |
| | | | | 73/114.26 |
| 5,361,629 | A | * | 11/1994 | McCombie ............ G01M 15/11 |
| | | | | 73/114.04 |
| 5,663,495 | A | * | 9/1997 | Allen .................... F02D 41/009 |
| | | | | 73/114.26 |
| 6,955,145 | B1 | | 10/2005 | McCabe et al. |
| 10,139,312 | B2 | | 11/2018 | Eom et al. |
| 10,634,077 | B2 | | 4/2020 | Mazenc |
| 2007/0044548 | A1 | * | 3/2007 | Ishizuka ................. F02D 41/22 |
| | | | | 73/114.26 |
| 2013/0269415 | A1 | * | 10/2013 | Fayyad ................. G01M 15/06 |
| | | | | 73/1.79 |
| 2015/0114097 | A1 | | 4/2015 | Zouboff et al. |
| 2016/0032852 | A1 | * | 2/2016 | Garrard ................. F02D 41/123 |
| | | | | 123/435 |
| 2020/0032723 | A1 | * | 1/2020 | Rajkumar ............. G01M 15/06 |

FOREIGN PATENT DOCUMENTS

| | | |
|---|---|---|
| CN | 107849993 A | 3/2018 |
| DE | 10 2011 078861 | 1/2013 |
| FR | 2 991 720 | 12/2013 |
| FR | 3 043 785 | 5/2017 |

OTHER PUBLICATIONS

Office Action issued in Chinese Patent Application No. 201980047081.1 dated Jun. 27, 2022.

Bai et al., "Collection Method of Synchronous Signal in Engine Control", Vehicle Engine Year 2014, 2014, Issue 6, pp. 33-38.

\* cited by examiner

PROCESSING METHOD FOR CAMSHAFT SENSOR

This application is the U.S. national phase of International Application No. PCT/EP2019/068732 filed 11 Jul. 2019, which designated the U.S. and claims priority to FR Patent Application No. 1856500 filed 13 Jul. 2018, the entire contents of each of which are hereby incorporated by reference.

BACKGROUND OF THE INVENTION

Field of the Invention

The present invention relates to the field of measurement and more particularly to camshaft sensors. It is directed in particular to processing for enhancing the reliability of the measurement signal by confirmation of the validity of a tooth front.

Description of the Related Art

It is known practice in automobiles to use a camshaft sensor to know the angular position of a camshaft with precision, in particular to carry out engine control.

As illustrated in FIG. 1, such a camshaft sensor conventionally comprises a camshaft wheel 2 coupled in rotation with the camshaft. This camshaft wheel 2 has a known particular profile. This profile conventionally comprises a reduced number of teeth, typically four, which are irregular, both in their angular extent and in their spacing. The camshaft sensor 1 further comprises a sensing element 3 fixed relative to the engine block, able to detect the particular profile and arranged for this purpose opposite the periphery of the camshaft wheel 2. According to one embodiment, the camshaft wheel 2 is metallic, and the sensing element 3 is able to detect the metal, like a Hall-effect sensor. It is thus possible to detect a rising tooth front (start of tooth) or falling tooth front (end of tooth). By virtue of the small number of teeth, both the rising fronts and the falling fronts are exploited. Advantageously, the tooth lengths and the inter-tooth space lengths are different. This makes it possible, in a known manner, to identify the camshaft wheel in a few camshaft revolutions, typically by a shape recognition method. The identification consists in determining which tooth is seen by the sensing element 3. The identification makes it possible to know, when a tooth front is detected by the sensing element 3, to which tooth said tooth front belongs. The identification thus makes it possible to know with precision the angular position of the camshaft, at least during a tooth front detection.

In order to maintain the angular setting provided by the identification, it is indispensable to detect all the tooth fronts and nothing but the tooth fronts at the risk to the contrary of offsetting the observed angular position of the camshaft.

The sensing element 3 can be deceived in at least two known cases. In the first case, an electrical interference causes a peak to appear on the measurement signal that may be confused with a tooth front. In the second case, the camshaft reverses its direction of rotation at least once. The sensing element 3 then detects a tooth front which is not the expected following tooth front but by contrast the immediately previously detected tooth front which is detected again and is of opposite type (a front of rising type in one direction of rotation is detected as a front of falling type when the rotation reverses, and vice versa).

In order to discriminate such aberrant tooth fronts, various methods for processing the signal from the sensing element 3 are known.

A first method consists in continuing to use the method employed during the identification to identify the camshaft wheel 2 in order to validate each tooth front.

Another method is proposed by FR 2991720. It uses a history of the tooth periods (period between the rising front and the falling front of a tooth) to construct a temporal indicator and an angular indicator. If a comparison of these two indicators finds them to be within a given tolerance, the tooth front is validated.

Another method consists in measuring the angular position of a tooth front of the camshaft wheel 2 by means of the crankshaft sensor. If this measurement corresponds to the theoretical value, possibly assigned a tolerance, the tooth front is validated.

All these methods, based on a temporal and/or angular indicator, have one disadvantage in common. In order to tolerate the high speed variations in the camshaft, it is necessary to greatly widen the acceptance tolerances. Moreover, the indicators employed must take account of the short and long teeth or inter-teeth spaces. A widened tolerance to adapt to the short teeth or inter-teeth spaces becomes a very widened tolerance for the long teeth or inter-teeth spaces.

In order to take account of the speed variation, it is conventional to use a tolerance of 200%. However, the difference in length between an interfering peak and a tooth having an extent of 20° can be only 33%. It is thus possible to confuse an interfering peak with a small tooth. In certain configurations, it is possible to confuse a following tooth front with the last tooth front detected, again detected in the opposite direction. As a result, the method or methods lose their discriminating capacity.

SUMMARY OF THE INVENTION

The objective of the invention is to propose a processing method allowing a camshaft sensor to verify that a tooth front detection, as seen on its signal, corresponds well to the following tooth front.

This objective is achieved by using a novel test applicable to each detection of a tooth front and making it possible to validate said tooth front or not. This test can be used in place of or in addition to the above-described tests.

The invention relates to a processing method for a camshaft sensor of the type comprising a toothed camshaft wheel and an opposite sensing element able to detect a tooth front, comprising the following steps:
detection of a new tooth front by said sensing element;
calculation of a rotational speed of the camshaft wheel for the new tooth front;
comparison with the rotational speed of the camshaft wheel for the preceding tooth front detected by said sensing element;
if the variation in the rotational speed of the camshaft wheel between the new tooth front and the preceding tooth front is low, the new tooth front is validated, otherwise the new tooth front is rejected.

According to another feature, a rotational speed is calculated by means of a ratio of an angle separating the new tooth front from the preceding tooth front to the period separating the new tooth front from the preceding tooth front.

According to another feature, the angle is taken equal to its theoretical value.

According to another feature, the variation in the rotational speed is low if the ratio of the rotational speed for the new tooth front to the rotational speed for the preceding tooth front is comprised between a first threshold and a second threshold, with preferably the first threshold and the second threshold being inverse to one another.

According to another feature, the second threshold is comprised between 1 by upper value and 10, preferably between 1 and 3, more preferably between 1 and 1.5, and more preferably equal to 1.2.

According to another feature, the variation in the rotational speed is low if the difference between the rotational speed for the new tooth front and the rotational speed for the preceding tooth front is, in absolute value, below a third threshold.

According to another feature, the third threshold is comprised between 200 and 1000 rev/min of the crankshaft, preferably substantially equal to 500 rev/min of the crankshaft.

The invention further relates to a device able to implement the method as claimed in any one of the preceding claims.

BRIEF DESCRIPTION OF THE DRAWINGS

Other features and innovative advantages of the invention will become apparent from reading the following description, which is provided by way of nonlimiting example, with reference to the appended drawings, in which.

DESCRIPTION OF THE PREFERRED EMBODIMENTS

For greater clarity, identical or similar elements are denoted by identical reference signs throughout the figures.

The method according to the invention makes it possible to process a signal from a camshaft sensor 1 to determine if a new tooth front is valid or not in order to make the measurement more robust.

Figure 2:
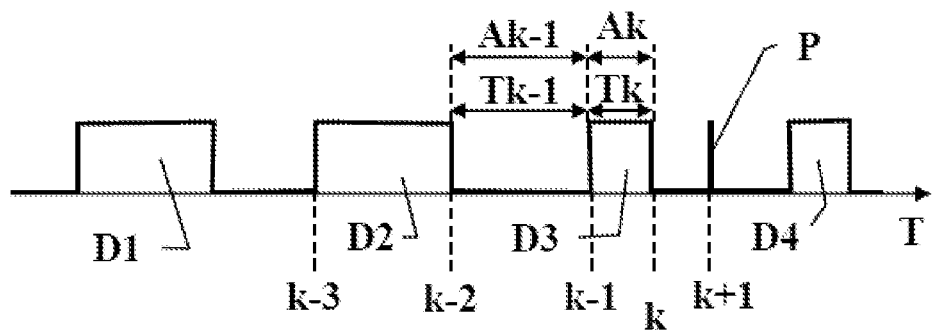
FIG. 2 presents a camshaft signal as a function of time and the validation of a tooth front.
Figure 3:
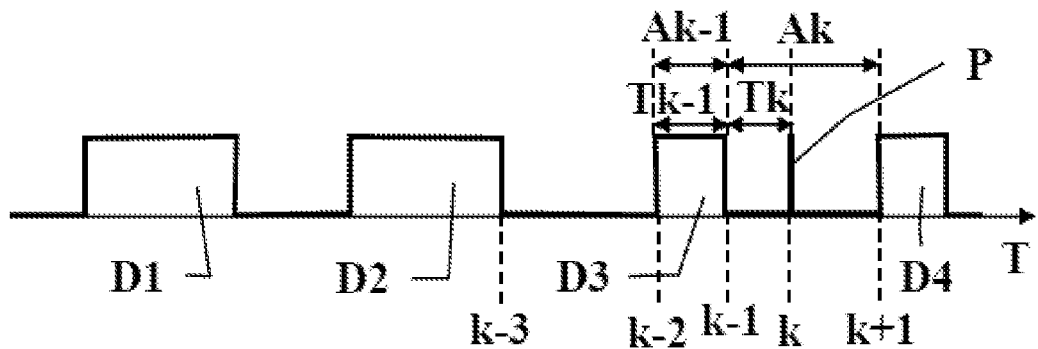
FIG. 3 presents the same camshaft signal as a function of time and the invalidation of a tooth front.

FIGS. 2 and 3 illustrate such a measurement signal from a camshaft sensor 1. This signal substantially reproduces the profile of the camshaft wheel 2. The signal presented comprises 4 teeth D1-D4 as a function of time T. An interference P has entered and could be confused with a tooth front.

In order to validate a tooth front, the processing method comprises the following steps. During a first step, a new tooth front is detected. This new tooth front is denoted k in a relative manner. The preceding tooth front is denoted k−1, whereas the following tooth front is denoted k+1. Likewise, the various quantities are indexed on the tooth fronts. Wk is the rotational speed determined with the information known during the detection of the tooth front k. Tk is the "tooth period" or time elapsed between the preceding tooth front k−1 and the new tooth front k. Ak is the angle between the preceding tooth front k−1 and the new tooth front k.

For the new tooth front k, a rotational speed Wk of the camshaft wheel 2 is calculated during a second step.

During a third step, this rotational speed Wk of the camshaft wheel 2 is compared with the rotational speed Wk−1 of the camshaft wheel 2 calculated for the preceding tooth front k−1 during the preceding validation of the preceding tooth front k−1.

The rotational speed of the camshaft, and hence of the camshaft wheel 2, has a certain regularity on account in particular of a limited acceleration. Thus, with the time interval that has elapsed between the preceding tooth front k−1 and the new tooth front k being very short, this speed cannot have a very high variation between the two tooth fronts k−1, k. Thus, by analyzing the variation in the rotational speed Wk of the camshaft wheel 2 between the preceding tooth front k−1 and the new tooth front k, it can be verified if this variation is sufficiently weak to be plausible, in that it is possible with regard to the limits of the mechanism. A weak variation in the rotational speed Wk makes it possible to validate the new tooth front k. By contrast, too high a variation results in invalidating the new tooth front k.

A tooth front for which the speed variation is too high does not correspond to a valid tooth front. What is concerned is either an interference or a front observed following a reversal of the direction of rotation of the camshaft. Thus, it can be ignored without consequence.

The instantaneous speed Wk of the camshaft wheel 2 at the new tooth front k is calculated by relating an angle Ak separating the preceding tooth front k−1 from the new tooth front k to the period Tk separating the preceding tooth front k−1 and the new tooth front k.

A period Tk or tooth period is typically extracted from the signal of the camshaft sensor 1 by measuring the temporal distance between the preceding tooth front k−1 and the new tooth front k.

An angle Ak is taken equal to its theoretical value. This theoretical value is known since the camshaft wheel 2 has been previously identified. Thus, the new tooth front k is identified, as for the preceding tooth front k−1, and hence for their angular distance.

This is an advantage of the method according to invention, in that it does not use the crankshaft sensor. Thus, the method according to the invention can be implemented in a degraded mode implemented in the event of failure of the crankshaft sensor.

It should be noted that the time Tk is the time separating the preceding tooth front k−1 from the new tooth front k, as effectively detected, whether this new tooth front is valid or not. By contrast, the angle Ak is the angle separating the preceding tooth front k−1 from the theoretically following tooth front. In the case of a valid new tooth front k, there is coincidence. However, in the case of an invalid new tooth front k, occurring earlier or later than envisioned, the angle Ak is the angle separating the preceding tooth front k−1 from the normally expected tooth front. In the case of a new tooth front k occurring earlier, the normally expected tooth front is the front k+1. In the case of a new tooth front k occurring later, the normally expected tooth front is absent from the measurement signal.

Referring now to FIG. 2, the method is applied to a valid tooth front. The new tooth front k is the falling front of the tooth D3. The detection by the camshaft sensor 1 of the new tooth front k makes it possible to determine the tooth period Tk, that is to say the period separating the new tooth front k, here the falling front of the tooth D3, from the preceding tooth front k−1, here the rising front of the tooth D3. The corresponding angle Ak is known: this is the angular length of the tooth D3. The speed Wk can then be calculated by relating the angle Ak to the time Tk, possibly assigned a scaling factor F, that is to say according to the formula Wk=F.Ak/Tk.

The factor F advantageously makes it possible to express the speed Wk in a signifying unit such as rad.s−1 or else rev.min−1. It can be stated that an angle is expressed in the crankshaft reference frame. This reference frame is conventionally used as a reference in automobiles to distinguish from a camshaft which rotates at half a speed.

This speed Wk can then be compared with the speed Wk−1 previously determined for the preceding tooth front k−1. There is found here a weak variation in the speed between the two tooth fronts k−1 and k. Thus, the falling front of the tooth D3 is validated.

It should be noted that the speed Wk−1 previously determined for the preceding tooth front k−1 means the speed determined for the immediately preceding tooth front but especially for a validated tooth front. Throughout the method, when a tooth front is invalidated and rejected, it is deemed to have never existed. The same applies for the time Tk and angle Ak quantities.

Referring now to FIG. 3, the method is applied to an invalid tooth front, here a front artificially caused by an electrical interference P. Alternatively, an invalid tooth front could be a tooth front resulting from a change in direction of rotation of the camshaft and would produce a tooth front occurring earlier or later than expected. The new tooth front k is here the interference P. The detection by the camshaft sensor 1 of the new tooth front k makes it possible to determine the tooth period Tk, that is to say the period separating the new tooth front k, here the interference P, from the preceding tooth front k−1, here the falling front of the tooth D3. The corresponding angle Ak is known. However, the new theoretically expected tooth front is the rising front of the tooth 4D4. Thus, the angle Ak is the angle between the falling front of the tooth D3 and the rising front of the tooth D4. It does not correspond to the period Tk. The speed Wk can then be calculated by relating the angle Ak to the time Tk.

This new speed Wk can then be compared with the speed previously determined for the preceding tooth front. Here, the noncorrespondence between the angle Ak and the tooth period Tk results in too high a variation in the speed between the two tooth fronts k−1 and k. Thus, the interference P is not validated.

At least two different tests are possible to determine if the variation in the rotational speed Wk is weak, sufficiently for this variation to be plausible.

According to a first test, the ratio of the rotational speed Wk for the new tooth front k to the rotational speed Wk−1 for the preceding tooth front k−1 is determined. The variation in the speed is weak if said ratio is comprised between a first threshold S1 and a second threshold S2, i.e. S1<Wk/Wk−1<S2. Preferably, the first threshold S1 and the second threshold S2 are inverse to one another. The formula then becomes 1/S2<Wk/Wk−1<S2.

This second threshold S2 is comprised between 1 by upper value and 10. Preferably, it is comprised between 1 and 3. More preferably, it is comprised between 1 and 1.5. A value of 1.2 is preferably adopted, that is to say a 20% tolerance of speed variation between two fronts.

According to a second test, as an alternative or in addition to the first, the variation in the rotational speed Wk is weak if the difference between the rotational speed Wk for the new tooth front k and the rotational speed Wk−1 for the preceding tooth front k−1 is, in absolute value, below a third threshold S3, i.e. Abs(Wk−Wk−1)<S3.

Advantageously, the third threshold S3 is comprised between 200 and 1000 rev/min of the crankshaft, preferably substantially equal to 500 rev/min of the crankshaft. For this second test, the speeds Wk, Wk−1 are expressed in the same unit as the third threshold S3.

It should be noted that the thresholds S1, S2, S3 can be modified as a function of the shape of the camshaft wheel and of the relative distribution of the teeth and notches so as to increase or decrease the acceptance tolerance.

Figure 1:
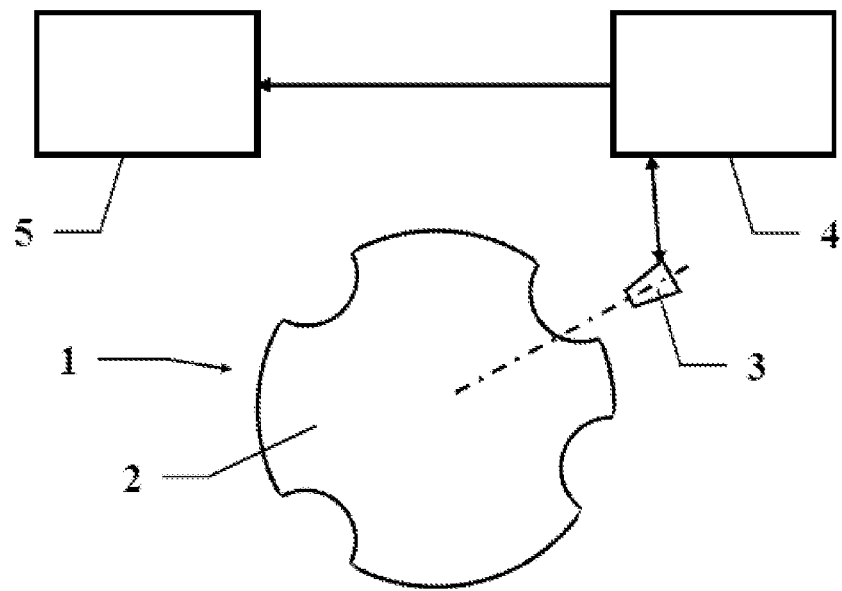
FIG. 1, already described, illustrates the principle of a camshaft sensor.

The invention further relates to a device 4 able to implement the method according to any one of the preceding embodiments. As illustrated in FIG. 1, such a device 4 is interfaced with the sensing element 3 of the camshaft sensor 1. It implements the above-described method to process the signal from the camshaft sensor 1. It can thus deliver more robust camshaft information to a user 5, such as an engine control unit.

The invention is described in the foregoing by way of example. It will be understood that a person skilled in the art is able to produce different variant embodiments of the invention, for example by combining the various features above taken alone or in combination, without departing from the scope of the invention in doing so.

The invention claimed is:

1. A processing method for a camshaft sensor (1) equipped with a toothed camshaft wheel (2) and an opposite sensing element (3) configured to detect a tooth front, the method comprising:
    detecting a new tooth front (k) by said sensing element;
    calculating a rotational speed (Wk) of the camshaft wheel (2) for the new tooth front (k);
    comparing the rotational speed (Wk) of the camshaft wheel (2) for the new tooth front (k) with a rotational speed (Wk−1) of the camshaft wheel (3) for a preceding tooth front (k−1) detected by said sensing element; and
    when a variation in the rotational speed (Wk) of the camshaft wheel (2) between the new tooth front (k) and the preceding tooth front (k−1) is low, the new tooth front (k) is validated, otherwise the new tooth front (k) is rejected.

2. The method as claimed in claim 1, wherein the rotational speed (Wk) is calculated by means of a ratio of an angle (Ak) separating the new tooth front (k) from the preceding tooth front (k−1) to a period (Tk) separating the new tooth front (k) from the preceding tooth front (k−1).

3. The method as claimed in claim 2, wherein the angle is taken equal to a theoretical value.

4. The method as claimed in claim 1, wherein the variation in the rotational speed (Wk) is low when a ratio of the rotational speed (Wk) for the new tooth front (k) to the rotational speed (Wk−1) for the preceding tooth front (k−1) is comprised between a first threshold (S1) and a second threshold (S2).

5. The method as claimed in claim 4, wherein the second threshold (S2) is comprised between 1 and 10.

6. The method as claimed in claim 1, wherein the variation in the rotational speed (Wk) is low when a difference between the rotational speed (Wk) for the new tooth front (k) and the rotational speed (Wk−1) for the preceding tooth front (k−1) is, in absolute value, below a third threshold (S3).

7. The method as claimed in claim 6, wherein the third threshold (S3) is comprised between 200 and 1000 rev/min of a crankshaft.

8. A device (4) that implements the method as claimed in claim 1.

9. The method of claim 4, wherein the first threshold (S1) and the second threshold (S2) are inverse to one another.

10. The method as claimed in claim 4, wherein the second threshold (S2) is comprised between 1 and 3.

11. The method as claimed in claim 4, wherein the second threshold (S2) is comprised between 1 and 1.5.

12. The method as claimed in claim 4, wherein the second threshold (S2) is equal to 1.2.

13. The method as claimed in claim 6, wherein the third threshold (S3) is substantially equal to 500 rev/min of a crankshaft.

14. The method as claimed in claim 3, wherein the variation in the rotational speed (Wk) is low when a ratio of the rotational speed (Wk) for the new tooth front (k) to the rotational speed (Wk−1) for the preceding tooth front (k−1) is comprised between a first threshold (S1) and a second threshold (S2).

15. The method as claimed in claim 2, wherein the variation in the rotational speed (Wk) is low when a difference between the rotational speed (Wk) for the new tooth front (k) and the rotational speed (Wk−1) for the preceding tooth front (k−1) is, in absolute value, below a third threshold (S3).

16. The method as claimed in claim 3, wherein the variation in the rotational speed (Wk) is low when a difference between the rotational speed (Wk) for the new tooth front (k) and the rotational speed (Wk−1) for the preceding tooth front (k−1) is, in absolute value, below a third threshold (S3).

17. The method as claimed in claim 4, wherein the variation in the rotational speed (Wk) is low when a difference between the rotational speed (Wk) for the new tooth front (k) and the rotational speed (Wk−1) for the preceding tooth front (k−1) is, in absolute value, below a third threshold (S3).

18. The method as claimed in claim 5, wherein the variation in the rotational speed (Wk) is low when a difference between the rotational speed (Wk) for the new tooth front (k) and the rotational speed (Wk−1) for the preceding tooth front (k−1) is, in absolute value, below a third threshold (S3).

19. A device (4) that implements the method as claimed in claim 2.

20. A device (4) that implements the method as claimed in claim 3.

* * * * *